Figure 1:
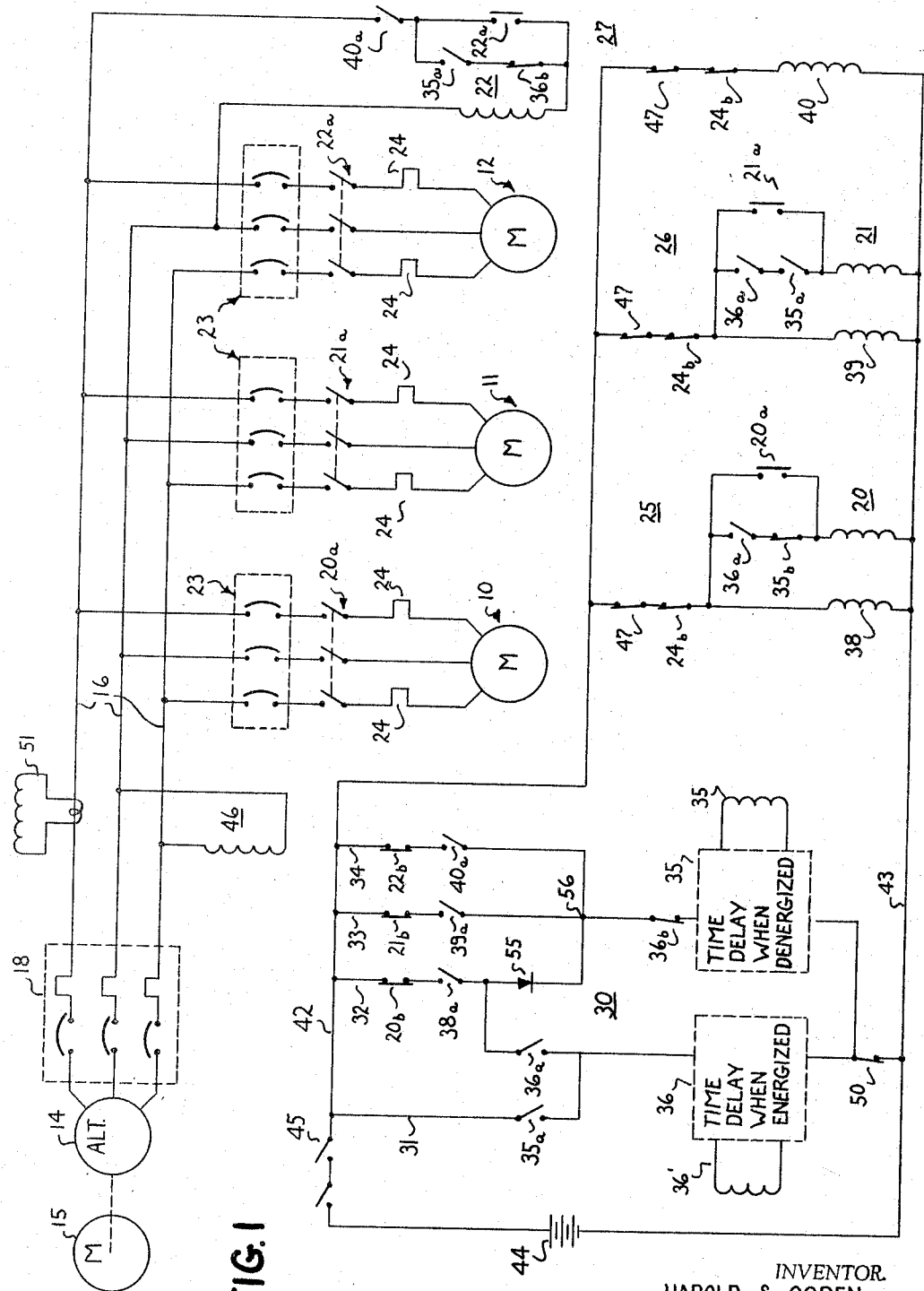

May 2, 1967   H. S. OGDEN   3,317,802
SEQUENTIAL STARTING SYSTEM FOR A PLURALITY OF MOTORS
Filed Dec. 13, 1963   2 Sheets-Sheet 2

| | PILOT RELAY 38 | CONTACTOR 20 | PILOT RELAY 39 | CONTACTOR 21 | PILOT RELAY 40 | CONTACTOR 22 | TIME DELAY ELEMENT | | TIME DELAY ELEMENT | |
|---|---|---|---|---|---|---|---|---|---|---|
| | | | | | | | 35 | 35' | 36 | 36' |
| 1 | X | | X | | X | | | | | |
| 2 | X | | X | | X | | X | | | |
| 3 | X | | X | | X | | X | X | | |
| 4 | X | | X | | X | X | X | X | TIMING | |
| 5 | X | | X | | X | X | X | X | X | |
| 6 | X | | X | | X | X | X | X | X | X |
| 7 | X | | X | X | X | X | TIMING | X | X | X |
| 8 | X | | X | X | X | X | | X | X | X |
| 9 | X | | X | X | X | X | | | X | X |
| 10 | X | X | X | X | X | X | | | X | X |
| 11 | X | X | X | X | X | X | | | | |

FIG. 2

INVENTOR.
HAROLD S. OGDEN
BY
HIS ATTORNEY

United States Patent Office 3,317,802
Patented May 2, 1967

3,317,802
SEQUENTIAL STARTING SYSTEM FOR A PLURALITY OF MOTORS
Harold S. Ogden, Erie, Pa., assignor to General Electric Company, a corporation of New York
Filed Dec. 13, 1963, Ser. No. 330,345
4 Claims. (Cl. 318—102)

This invention relates to a new and improved control system for starting a plurality of motors in a predetermined sequence and more particularly to such a system wherein only one such motor may be started at any one time. Although this invention may be started at any one time. Although this invention has a wide range of applications, it is particularly useful with certain railway equipment and will be particularly described in that connection.

Various control systems are known in the prior art for starting and running a number of motors from a common power supply and wherein means are provided for preventing the simultaneous starting of more than one of the motors. Some of these prior art systems have employed timing motors and cam switch drive arrangements to obtain the desired sequence of starts and provide for the necessary time between such starts to assure satisfactory starting under different loading conditions. Such systems have not been entirely satisfactory, however, since the time between starts must be provided for the worst condition thereby requiring an undesirably long time to start a particular motor in many instances. Other prior art systems have employed special timing sequence relays. Again these systems are required to provide for the slowest starting motor even when the motors come up to speed quickly or with very low currents. Further, the cost of such special time sequence relays contributes to the expense of such control systems.

It is an object of this invention, therefore, to provide a control system for starting a plurality of motors one at a time in predetermined sequence which substantially avoids one or more of the prior art difficulties.

It is another object of this invention to provide a control system for starting a plurality of motors one at a time in predetermined sequence and wherein the time between starts is significantly reduced as compared to the known prior art systems.

Briefly stated, in accordance with one aspect of this invention, the new and improved control system comprises a contactor for each motor arranged for connecting each of the motors to the power supply and an actuating circuit for each contactor which includes a control circuit portion arranged for causing operation of the contactors in a predetermined sequence. The system also includes a voltage sensing means which is operative to energize the contactor actuating circuits and start the operating sequence of the associated contactors when the supply voltage reaches a predetermined level. A current sensing means is provided operative when motor currents exceed a selected level to prevent further progression of the sequencing operation until motor currents fall below the selected level. Thus, as long as motor currents do not build up to values that would cause excessive voltage dip, the next motor in the sequence may be started immediately.

The novel features believed characteristic of this invention are set forth with particularity in the appended claims. My invention itself, however, both as to its organization and method of operation, together with further objects and advantages thereof, may best be understood by reference to the following description taken in connection with the accompanying drawing in which:

FIG. 1 is a simplified schematic circuit diagram of a railway equipment incorporating the control system of this invention; and FIG. 2 is a chart illustrating the sequence of operation of the various contacts of the system of FIG. 1.

The illustrations employed in the figures of this disclosure have been arranged to facilitate the disclosure of the invention as to its mode of operation rather than for the purpose of illustrating the actual construction and arrangement of components that would be employed in an actual system. Thus, for example, the various relay and contactor coils may be shown at one location in the system diagram while the various contacts thereof are shown in a number of different locations. In addition, for convenience, normally open contacts are designated with a subscript letter *a* while normally closed contacts are designated with a subscript letter *b*.

In FIG. 1 the railway equipment includes two air conditioner motors 10 and 11 and an air compressor motor 12 which are to be started and run from a small alternator 14. Alternator 14 may be conveniently driven by a motor 15 and supplies power to the three motors through the supply circuit 16 having a thermal protective circuit breaker 18 therein.

The motors 10, 11 and 12 are started and stopped by operation of contactors 20, 21 and 22 which by closure of their contacts 20a, 21a and 22a, respectively connects the motors to the supply circuit 16 through suitable protective breakers 23 and thermal overload relays 24. Contactors 20, 21 and 22 may be selected to operate from the supply circuit 16, from a low voltage direct current supply or some of the contactors may be selected to operate from the power of supply circuit 16 and others from a low voltage direct current supply. This is illustrated, for example, in the system of FIG. 1 wherein the energizing coils of contactors 20 and 21 are shown connected to a low voltage direct current supply circuit and the energizing coil of contactor 22 is shown connected to the supply circuit 16.

Operation of the contactors is provided by the contactor actuating circuits 25, 26 and 27 associated respectively with motor starting contactors 20, 21 and 22. The actuation circuits comprise a particular combination of closed contacts to provide a closing circuit for the respective contactor. The proper combination of closed contacts to achieve the desired operating sequence of motor starting is controlled by a control circuit portion 30 having a plurality of parallel paths 31, 32, 33 and 34 which through appropriate interlock contacts control the operation of time delay elements 35 and 36. Time delay elements 35 and 36 have auxiliary circuits 35′ and 36′ respectively. One time delay element is selected to provide its delay when energized while the other provides its delay when de-energized. As shown in FIG. 1, time delay element 35 provides its delay when de-energized and time delay element 36 its delay when energized. The time delay necessary is only that necessary to allow time for the starting currents to build up to their maximum values so that if such currents are above a predetermined level the time delay elements 35 and 36 may be de-energized to prevent any further advance of the starting sequence. This time is, of course, relatively short.

Time delay elements 35 and 36 may be of any well-known type and preferably are solid-state type time delay devices such as solid-state time delay relays.

The operation of the contactors in a desired sequence is provided by sequencing time delay elements 35 and 36 and depending upon the proper combination of closed contacts on one of these delay elements in each of the actuation circuits 25, 26 and 27 to establish the closing circuit for the respective contactor. For example, for the selected sequence shown in FIG. 1, actuation circuit 25 includes a normally closed contact 35b of time delay element 35 and a normally open contact 36a of time delay element 36. Similarly, actuation circuit 26 includes normally open contacts 35a and 36a of time delay elements 35 and 36 respectively. Also, actuation circuit 27 includes a normally open contact 35a of time delay element 35 and normally closed contact 36b of time delay element 36. Since it is usually more desirable to provide for fail-safe operation, the combination from time delay elements 35 and 36 respectively of two normally closed contacts in an actuation circuit would be avoided.

From the foregoing, therefore, it will be understood that although only three motors with the required time delay element contact combinations are shown in FIG. 1, the system may readily be extended to provide for the sequential starting of any number of motors.

Actuation circuits 25, 26 and 27 each include a pilot relay 38, 39 and 40 having associated interlocks in control circuit portion 30 with the contactors 20, 21 and 22, respectively. Thus, control circuit path 32 includes the normally closed interlock contact 20b of contactor 20 and the normally open contact 38a of pilot relay 38. Similar interlocking contacts 21b and 39a and 22b and 40a are included in the control circuit paths 33 and 34 respectively.

The actuation circuits are energized from a direct current supply circuit shown as comprising the conductors 42 and 43 and a suitable direct current voltage source, such as the battery 44. The direct current supply circuit is energized from battery 44 through the normally open contact 45 of a voltage sensing device, such as voltage sensing relay 46, which senses the voltage of supply circuit 16 and closes contact 45 when the voltage reaches a preselected level.

The pilot relays 38, 39 and 40 are energized from the direct current supply circuit through closing circuits including the normally closed thermal overload contacts 24b and the contacts 47 of a suitable device which operates to call for starting or stopping of the respective motors 10, 11 and 12. For example, air conditioner motors 10 and 11, which are started and stopped by operation of contactors 20 and 21 respectively, may have the contact 47 operated by a suitable thermostat device. Similarly, air compressor motor 12, which is started and stopped by contactor 22, may have the contact 47 operated by a suitable air compressor governor.

The control circuit portion 30 is also energized from the direct current supply circuit through normally closed contact 50 of a current sensing device, such as the start release relay 51, which is coupled to one of the conductors of supply circuit 16. Current sensing relay 51 senses all load currents and when the high motor starting currents are present, contact 50 is caused to open to de-energize time delay elements 35 and 36 and prevent further advance of the motor starting sequence. Time delay elements 35 and 36 are also interlocked to the direct current supply circuit through the normally open contacts 35a and 36a. To reduce the number of control contacts required, a blocking diode 55 is provided in the circuit path 32. For example, blocking diode 55 assures that only the current from the direct current supply circuit in path 32 is effective in maintaining the holding circuit for time delay element 36 when the interlocking contact 36a between paths 31 and 32 closes and not current from the path 33 or 34.

When a number of motors, such as large induction motors for example, are to be started and run from a small alternator, it is necessary to make sure that only one motor is started at any one time. It is well known, for example, that induction motors require much more current during the starting period than they require to remain running. If two or more motors are started simultaneously, therefore, the in-rush currents can be so large that the alternator output voltage is caused to fall to an undesirably low value. The alternator voltage can often fall so low that it cannot support the motor current required to accelerate the motors attempted to be started. As a result the system voltage may actually collapse to practically zero and all motors will either stop or run at a very low speed.

In some systems the motors must be independently and randomly started. In addition, when the system is initially started, the control device, such as thermostats, governors or the like, all call for an immediate start. For these reasons the control system of this invention is provided to assure that no more than one motor will start at any one time.

The operation of the system of FIG. 1 may best be described with the aid of the sequence chart of FIG. 2 for an initial starting condition wherein the contacts 47, associated with the thermostats or governor, all are closed thereby calling for an immediate start of all motors 10, 11 and 12. Other operating conditions wherein less than all motors call for starting will be readily apparent. It may be noted here also that in this invention the contacts 47 are not required to carry the full current of the contactor so that low capacity thermostats, governors or the like may be employed. Also, some of the contactor actuation circuits may be arranged to operate from alternating current, such as that of the motor power supply, or from a low voltage direct current supply without any additional circuit components being required to add complexity to the system.

As alternator 14, driven by motor 15, comes up to speed, its output voltage builds up until it reaches the desired level and energizes the coil of voltage sensing relay 46 causing the contact 45 thereof to close. Closure of contact 45 applies the positive battery voltage to conductor 42 which energizes the direct current supply circuit from the battery 44 which in turn energizes pilot relays 38, 39 and 40. Energization of the pilot relays closes the interlock contacts 38a, 39a and 40a in paths 32, 33 and 34 respectively of control circuit portion 30 and the contact 40a in actuation circuit 27. Closure of the pilot relay contacts causes the positive voltage of conductor 42 to be applied to time delay element 35 causing it to be energized. Energization of time delay element 35 provides for the first, second and third steps shown on the sequence chart of FIG. 2.

Energization of time delay element 35 causes normally closed contact 35b in actuation circuit 25 to open. Since contact 36a is normally open when time delay element 36 is not energized, the additional opening of contact 35b does not affect circuit 25. Similarly, closure of the normally open contact 35a in actuation circuit 26 by energization of time delay element 35 is similarly ineffective since contact 36a thereof is also open. In actuation circuit 27, however, closure of normally open contact 35a due to its combination with normally closed contact 36b and now closed contact 40a of pilot relay 40 is effective to connect the energizing coil of contactor 22 to the supply circuit 16 through pilot relay contact 40a and time delay element contacts 35a and 36b. Contactor 22 seals itself through the holding circuit established by closure of the normally open contact 22a in actuation circuit 27.

With the operation of motor starting contactor 22, the large starting currents required by air compressor 12 may be sufficient to cause current sensing relay 51 to cause contact 50 thereof to open thereby opening the circuit between time delay element 35 and the direct current supply circuit. Opening of contact 50 prevents any further starting functions until the large starting currents have disappeared indicating that air compressor motor 12 has come up to speed. If the starting current is not large enough to cause current sensing relay 51 to open its contact 50, however, the system could immediately call for the starting of the next motor. To this end relay 51 is adjusted to provide that for currents anywhere below its pickup point a second motor may be started without the danger of developing total currents that would cause undesirably low voltages. For example, under some conditions with light load on the alternator 14, the first motor may start with currents that are not large enough to cause relay 51 to open its contact 50, thus permitting the second motor to start at once.

Operation of contactor 22 causes the interlock path 34 in control circuit portion 30 to be disabled by opening of contact 22b therein. After the motor 12 has come up to speed and the large starting currents have disappeared, contact 50 recloses. Then, through the interlock paths 32 and 33, the time delay element 35 operates as before. Contact 35a in path 31, therefore, closes causing time delay element 36 to be energized to begin its delayed operation of its contacts. The operation of contact 35a in path 31 and eventual closure of contact 36a between paths 31 and 32 completes the sequence through the sixth step as shown in FIG. 2.

When time delay element 36 operates, a holding circuit therefor is provided from path 32 and through the contact 36a between paths 31 and 32. As stated hereinbefore, blocking diode 55 insures that only current from the path 32 is effective in maintaining the holding current and not current from the path 33.

Operation of time delay element 36 closes contact 36a in actuation circuit 25 but has no effect since the normally closed contact 35b of time delay element 35 is now open. Operation of time delay element 36, however, completes the closure circuit for contactor 21 since the contacts 35a and 36a, of actuation circuit 26 are both closed. Contactor 21, therefore, is caused to operate and motor 11 is connected through the contacts 21a to the supply circuit 16. At the same time a holding circuit is completed for contactor 21 by closure of the contact 21a in actuation circuit 26.

As before, the presence of large starting currents causes contact 50 to open, de-energizing time delay elements 35 and 36 and preventing any further progression of the starting operations. When the motor 11 has accelerated and the large starting currents have disappeared, contact 50 recloses and the sequence is completed to step 7.

With the completion of step 6, however, contact 36b from the junction 56 of paths 32, 33 and 34 to time delay element 35 opens and eventually after completion of the time delay associated therewith, the contacts of time delay element 35 are operated providing position 9 on the chart of FIG. 2. This action opens contact 35a in the path 31 but time delay element 36 remains energized through path 32 and the interlock contact 36a.

When the contacts of time delay element 35 operate due to its de-energization, the normally closed contact 36b of actuation circuit 25 closes and since contact 36a is also closed, since time delay element 36 is energized, the contactor 20 is operated to connect motor 10 to the supply circuit 16 through the contacts 20a. The holding circuit for contactor 20 is completed by closure of the contact 20a in actuation circuit 25.

Again should there be high starting currents, contact 50 will open as before to de-energize time delay elements 35 and 36. Should the starting currents be low, however, as sometimes occurs so that contact 50 does not open, then the time delay elements are de-energized due to the opening of normally closed contact 20b in interlock path 32 when contactor 20 operates. Position 11 of the sequence chart is then reached and all motors are running.

From the foregoing description, it becomes apparent that the individual motors will always be started one at a time regardless of the sequencing of closing of the individual contacts 47 which are associated with the particular devices which are operative to call for operation of the motors. Moreover, the control system of this invention avoids the necessity for long built in time delays between starts to account for the worst starting condition even though at other conditions the motors may come up to speed rapidly and with low currents.

The time delay required in the foregoing described system of this invention is only that necessary to permit switches to close and the motor currents to build up to their maximum values. Thus, in the system of this invention the adjustment of the time delay elements is much less critical than the adjustments of the devices employed in the prior art systems employing timing arrangements.

While only certain preferred embodiments of this invention have been described in detail, it will be understood that various changes and modifications may be made by those skilled in the art without departing from the invention. It is intended, therefore, that the appended claims are to cover al lsuch changes and modifications which fall within the true spirit and scope of this invention.

What I claim as new and desire to secure by Letters of Patent of the United States is:

1. In a system for operating a plurality of electric motors from the output of a single power generation means including a plurality of contactors one operatively associated with each of the electric motors and each including an operating coil and contacts arranged to be actuated thereby between a circuit making condition connecting the associated electric motor to the output of said power generation means and a circuit breaking condition disconnecting the associated electric motor therefrom, the combination therewith of a control circuit means for preventing overloading of the power generation means during motor starting by controlling the operation of said contactors in a predetermined sequence comprising:

(a) first and second conductors arranged to be energized when the output voltage of said power generation means exceeds a preselected level;

(b) a plurality of pilot relays, one for each of said electric motors, each having an operating coil and at least one pair of contacts arranged to be operated thereby;

(c) a plurality of condition responsive means one associated with each of said electric motors and each including means responsive to the presence of a selected condition for connecting the operating coil of the pilot relay associated with the particular motor across the first and second conductors to cause energization of the operating coil and actuation of the contacts of said pilot relay;

(d) first and second time delay means each having a plurality of contacts actuated thereby;

(e) means including contacts of said pilot relays arranged to connect said first and second time delay means in parallel across said conductors for energization therefrom in a preselected sequence;

(f) a plurality of contactor actuating circuits one for each of said contactors, each of said actuating circuits arranged to be energized through the series combination of a contact of each of said first and second time delay means so that the energization sequence of said first and second time delay means provides for the energization of the operating coils of said contactors in a preselected sequence; and (g) current sensing means operative when the output current of said power generation means exceeds a preselected level for causing said first and second time delay means to be deenergized so that any further progression of the contactor operating coil energizing sequence is prevented until said current level returns to a selected lower level.

2. The control circuit means as set forth in claim 1 wherein one of said time delay means is arranged to exhibit its delay on energization and the other time delay means is arranged to exhibit its delay on deenergization.

3. The control circuit means as set forth in claim 1 wherein the first and second time delay means are solid-state time delay relays.

4. The control circuit means as set forth in said claim 2 wherein the first and second time delay means are solid-state time delay relays.

References Cited by the Examiner

UNITED STATES PATENTS

| | | | |
|---|---|---|---|
| 2,060,755 | 11/1936 | Exner | 318—102 |
| 2,096,626 | 10/1937 | Crago | 318—102 |

FOREIGN PATENTS 802,607  10/1958  Great Britain.

ORIS L. RADER, *Primary Examiner.*

T. LYNCH, *Assistant Examiner.*